July 7, 1942.   E. CLANCY   2,288,683
DEVICE FOR ANNOUNCING ITEMS OF INTEREST PERTAINING TO A VEHICLE
Filed Feb. 20, 1939   2 Sheets-Sheet 1

INVENTOR:
EDWARD CLANCY
BY Laugam Mom
ATTY.

July 7, 1942.  E. CLANCY  2,288,683
DEVICE FOR ANNOUNCING ITEMS OF INTEREST PERTAINING TO A VEHICLE
Filed Feb. 20, 1939  2 Sheets-Sheet 2

INVENTOR:
EDWARD CLANCY
BY
ATTY.

Patented July 7, 1942

2,288,683

UNITED STATES PATENT OFFICE 2,288,683

DEVICE FOR ANNOUNCING ITEMS OF INTEREST PERTAINING TO VEHICLES

Edward Clancy, Chicago, Ill.

Application February 20, 1939, Serial No. 257,377

4 Claims. (Cl. 35—11)

This invention relates to improvements in means for selecting and operating the reproduction of sounds mounted upon a vehicle in combination with means for actuating selected reproductions of sound in accordance with certain definite movements of the vehicle. This invention relates more particularly to an automatic phonograph and disc changer mounted upon an automobile in combination with a plurality of electrically operated disc selector actuator switches so constructed as to be operated by the starting, stopping, speeding, turning movements and vibrations of the automobile, as well as by the inclination of the road over which the automobile travels. This invention also contemplates its application to vehicles other than automobiles, such as airplanes and boats.

One of the objects of this invention is to provide what may be termed an automatic voice which may be connected to the speaker of radios now largely installed in automobiles or to a loud speaker installed in a convenient location within the body of an automobile whereby by the proper operation of the disc changer the phonograph will reproduce discussions upon various subjects and these subjects will be selected by the movements imparted to the automobile either by the driver in directing the direction of the automobile or by the character of the roadbed over which the automobile is travelling.

Among the advantages of this invention is that it may be so connected to the source of electricity for the ignition and lighting systems of the automobile that when a salesman takes a prospective customer out for a demonstration the starting of the automobile will initiate a carefully selected sales talk calling the prospective customer's attention to certain outstanding features of the new car, then in accordance with the character of the road over which the car travels various other features will be called to the prospective customer's attention, such as the stability of the car, the ease with which the car takes hills, the comfort of the passengers when travelling over rough roads and the ease with which the car may be brought to a full stop, as well as other advantages, and at the close of the demonstration give a selected discourse upon the various advantages demonstrated. Another advantage of this invention is that it may be readily and easily installed in any car of any make. This invention may also be used in instructing a new driver so that when the pupil commits the various errors found in most beginners the movement or vibration or change of direction of the car will operate a record giving a selected admonition to the pupil calling his attention to the fault he has committed and how to overcome it. Another advantage of this invention is that it may be applied to almost any vehicle for the transportation of human beings whereby an automatic phonograph disc record changer may be caused to supply desired information or amusement for the passengers, automatically selected and operated by the movement or vibration of the vehicle.

With these and other objects in view, reference is made to the accompanying sheets of drawings which illustrate an embodiment of this invention, with the understanding that minor changes may be made therein and the invention may be applied to other purposes without departing from the scope thereof.

Figure 1:
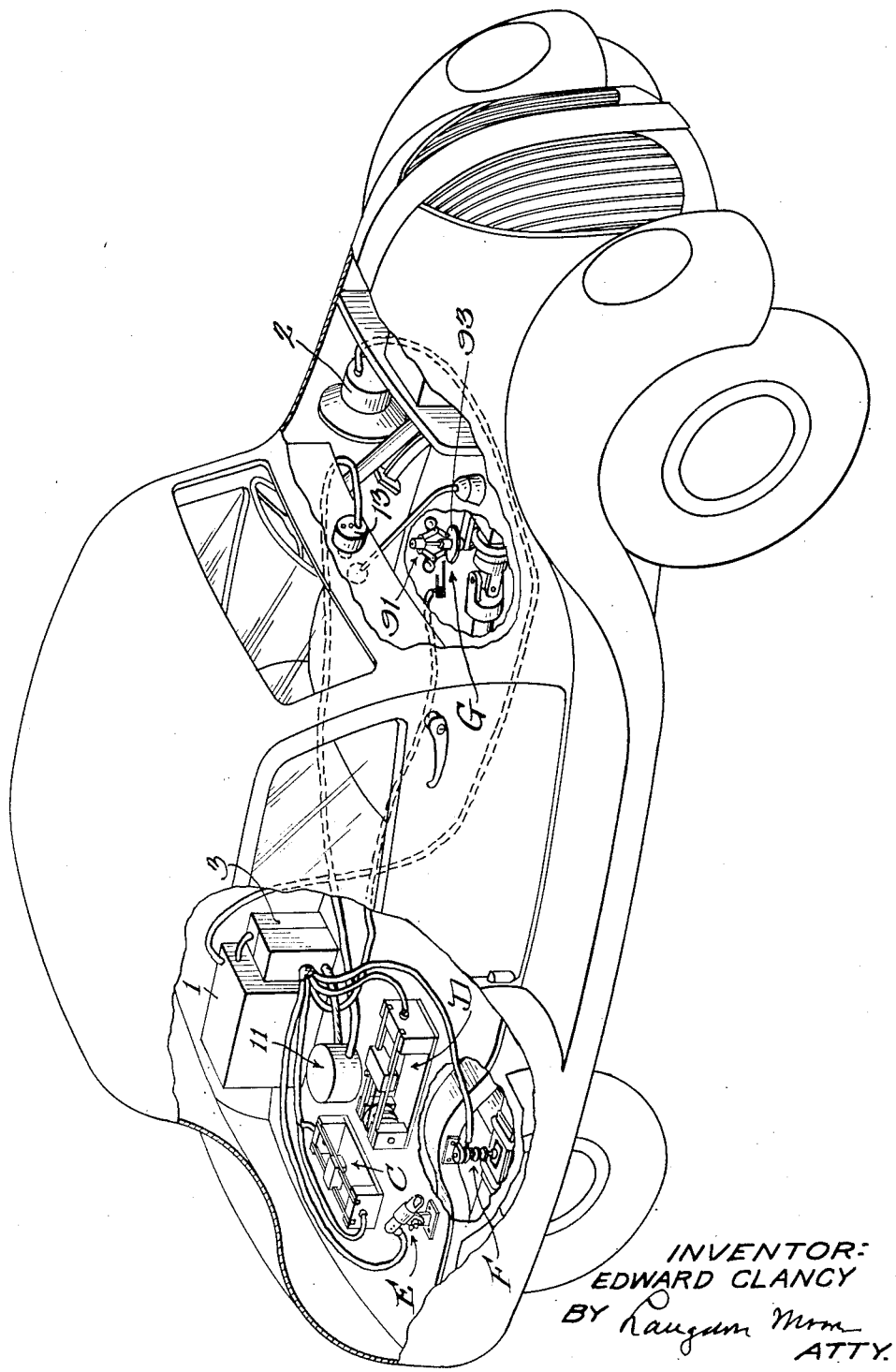
Figure 1 is a view in perspective of an embodiment of this invention as applied to an automobile, with parts broken away to illustrate the location and construction of the various cooperating elements embodied in this invention.

As shown in Figure 1, an electrically operated and controlled combination phonograph and selective record changer therefor of commercial form is mounted in a casing 1 shown carried upon the floorboards of the trunk of the automobile. The phonograph is connected to a loud speaker 2 which may be a part of a radio installed in the automobile or may be a loud speaker positioned in any desired location. Inasmuch as the electrically operated and controlled automatic record changer and phonograph is a commercial article and may be connected in any desired manner to the battery of the car, its particular connection thereto and its particular construction is not necessary to the understanding of this invention. While electrically operated and controlled automatic phonograph disc changers of this character are provided with various means for selecting the discs, for the ease of illustration a commercial type of push button actuator 3 is shown connected to the mechanism enclosed within the casing 1. In this particular form the selector is provided with actuator push buttons 4, 5, 6, 7, 8, 9 and 10 which when depressed will cause the mechanism to present a disc of the desired character to the phonograph and when released will be returned to normal position by a spring not shown.

It is preferable to employ a motor operated timing device 11 adapted to be connected in circuit with the battery B of the automobile and to the various push buttons of the selector apparatus 3, as hereinafter described. The energization of the motor 12 through the train of gears 16 will cause the rotation of a switch arm 15, also connected in the motor circuit through the switch arm 13. The timer mechanism illustrated in Figure 2 includes two spaced apart contacts 17 and 18 with the switch arm 15 normally remaining in a position spaced apart from and between the contacts, as shown in full lines in Figure 2. The timing mechanism also includes a circular contact member 19 concentric with the center of rotation of the contact arm 15, the circumference of which is interrupted to form the contacts 17 and 18 and also space the contacts 17 and 18 from the continuous arcuate portion of the contact 19. When the switch 13 closes the circuit through contact 14 to energize the motor 12 movement is imparted to the switch arm 15 causing it to travel and engage the contact 17. The contact 17 is connected by a wire 20 to a grounded solenoid 21 the energization of which causes its core 22 to advance and depress the selector button 4 which selects and sets into operation an introductory sales talk and thereafter the movement of the switch arm 15 passes out of engagement with the contact 17 and allows the spring 23 to return the core of the solenoid.

After bridging the gap between the contact 17 and the adjacent end of the circular contact 19 the contact arm 15 then travels over and into electrical engagement with the said circular contact member. During the travel of the contact arm 15 over the contact 19 various records may be selected by various switches closing a circuit from the wire 24 leading from the contact 19, to depress selected buttons as hereinafter described. After the contact arm 15 passes over the end of the circular contact 19 spaced apart from the contact 18 this circuit is broken. When the continued movement of the arm 15 causes it to engage the contact 18, a circuit is set up through wire 25 to the grounded solenoid 26 to extend its core 27 to depress the selector button 10 which operates the disc changer to present to the phonograph a disc reproducing a selected summation sales talk. The continued operation of the motor 12 then moves the contact arm 15 out of engagement with the contact 18 breaking the circuit to the selecting means and will then cause the contact arm 15 to again engage the contact 17 unless the switch 13 is moved to break the circuit to the motor 12. For that reason it is preferable to provide a switch arm 13 which may be operable independent of the ignition switch. Otherwise, the demonstrator would have to bring the prospective customer back to the garage so that the ignition switch could be opened before the first sales talk is repeated.

This invention contemplates interposing between the button 4 and the button 10 of the casing 3 as many buttons as may be necessary to present the desired number of records to be operated by the desired number of switches actuated by different movements of the car. For example, and in the way of illustration, the switches C, D, E and F are electrically connected through similar mechanisms to depress buttons 5, 6, 7 and 8 when the movement of the car closes one of said switches.

Figure 2:
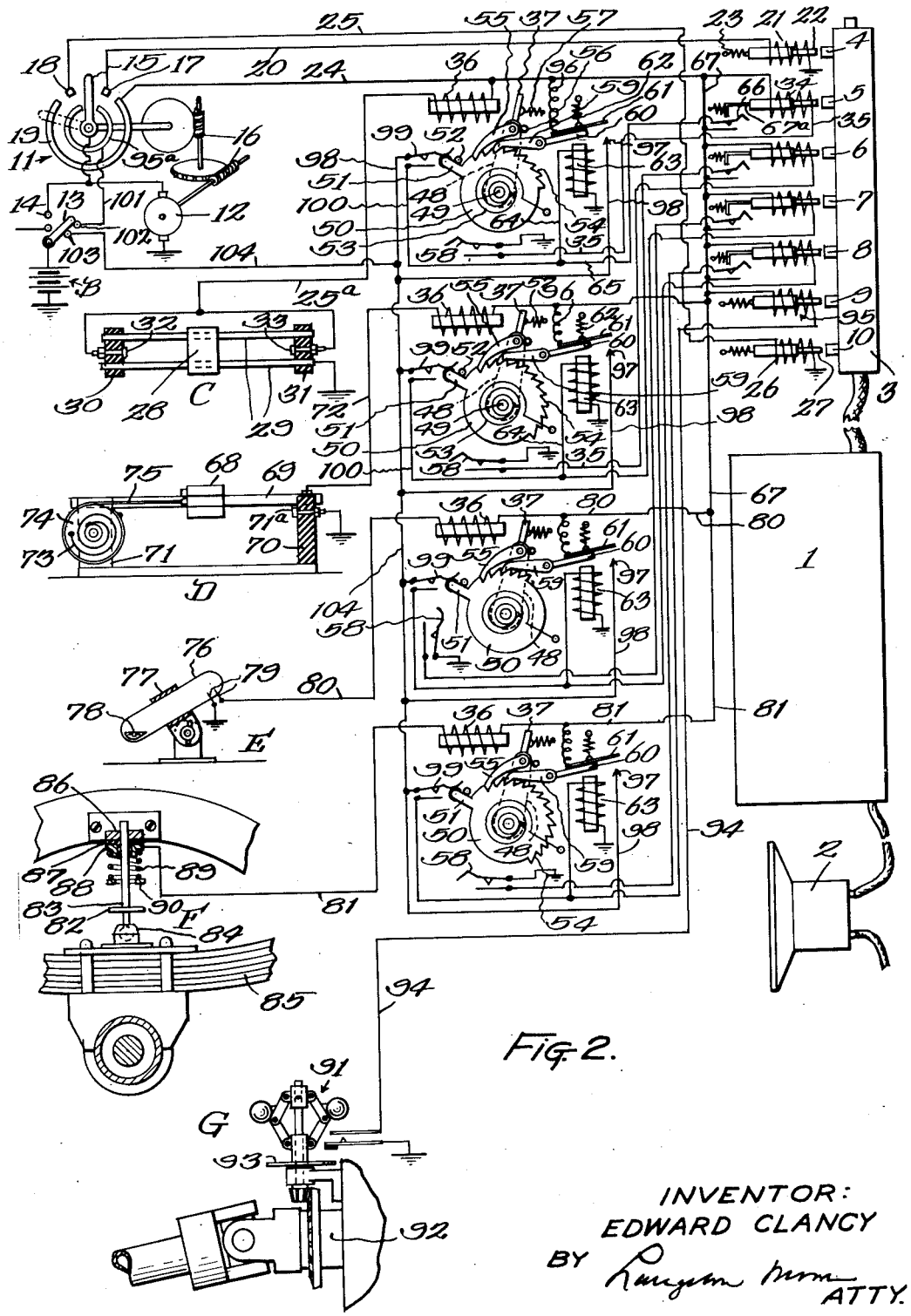
Figure 2 is a diagrammatical view including a wiring diagram illustrating the various switches and mechanism controlled thereby to select the various records.

As shown in Figure 1, switch C is mounted upon the floorboards of the trunk transversely of the longitudinal axis of the car. As shown in Figure 2, switch C includes a contact member 28 mounted to slide upon guide rods 29 supported between two posts 30 and 31 of insulating material and when the contact C engages a contact 32 passing through the insulating support 30 a circuit will be closed from the circular contact 19, through wire 24 and wire 25ª to contact 32, through sliding contact 28 to guide 29 which is grounded, and when contact 28 slides to engage the opposite insulated support 31 it will close a circuit in the same manner from wire 25 through contact 33 passing through the insulated post 31. As this switch C is mounted transversely of the car, a sudden change in direction of travel, such as going around a curve, will cause the sliding contact 28 to travel over its guides and close the circuit through either contact 32 or contact 33 in accordance with the change in direction. A solenoid 34 similar to the solenoid 21 for operating the initial sales talk is arranged opposite the button 5 which it will depress in the same manner as button 4 when energized. Wire 24 from the circular contact 19 is connected to one end of the winding of the solenoid 34 and the other end of the winding is connected by wire 35 to one terminal of a normally open switch, the other terminal of which is grounded, so that when this switch is closed the solenoid will be energized to cause its core to extend and depress the button 5. A means is provided to close this switch upon engagement of the sliding contact 28 with either of the contacts 32 or 33. This means includes an electromagnet 36 connected in circuit with the wire 25ª leading from wire 24 to the switch C so that when the sliding contact closes the circuit through wire 25ª the magnet will be energized. The armature 37 for the magnet 36 is carried by and forms an extension of an arm 48, the opposite end of which is pivotally mounted upon the stud 49. The stud 49 mounts a disc 50 mounted to rotate independently upon the stud 49 and is provided with a radially extending switch operating arm 51 normally held in contact with a post 52 by a coil spring 53, as shown in Figure 1. The periphery of the disc 50 to the right of the switch operating arm 51 is provided with a plurality of ratchet teeth 54 and the pivoted arm 48 is provided with a pivoted pawl 55, the free end of which is adapted to engage the ratchet teeth 54. The arm 48 is normally held in engagement with a post 56 with the armature 37 spaced apart from the magnet 36 by a spring 57, as shown in Figure 1. When the magnet 36 is energized the armature 37 imparts a rotation to the arm 48 and through the pawl 55 imparts a rotation to the disc 50 to cause the switch operating arm 51 to approach the open switch member 58 which when closed will close the circuit through the wire 35. As it is usually desirable to have this mechanism so constructed that the switch C will only actuate the solenoid 34 to depress the button 5 after repeated closures of the circuit through the wire 35 by the sliding movement of the contact 28, a plurality of ratchet teeth 54 are provided upon the disc 50 so that after the car has travelled around several curves in one direction and then in the other causing the contact 28 to slide into and out of engagement with the contacts 32 and 33 the magnet 36 will be alternately energized and de-energized and therefore impart a step-by-step movement by the pawl 55 to the disc 50. The switch operating extension 51 is so located on the disc 50 that after the desired number of step-by-step movements have been imparted to the disc the arm 51 will have travelled sufficiently to cause an insulating roller carried on the end thereof to engage and depress member 58 of the normally open switch to close the circuit through the wire 35.

In order to release the disc 50 to return to its normal position and be available to again actuate the solenoid 34 a releasing pawl 59 is pivotally mounted upon a post so that its free end will travel over the ratchet teeth of the disc 50 under the pawl 55. To cause the releasing pawl to lift out of engagement with the ratchet teeth and at the same time lift the pawl 55 out of engagement therewith to allow the spring 53 to return the disc 50 to its normal position, an armature 60 with an insulated extending contact 61 is carried by the pawl 59 on the opposite side of its pivot. The armature 60 is normally retracted by a spring 62 to cause the free end of the pawl 59 to maintain engagement with the ratchet teeth. The armature is arranged to impart a lifting movement to the pawl 59 upon the energization of an electromagnet 63 having one end of its windings grounded and the other winding connected in circuit by a wire 64 connected to wire 65 connected to one member 66 of a normally open switch, the other member of which is connected by wire 67 to wire 24. The end of the solenoid 34 opposite the button 5 is provided with an extension 67ª adapted to engage the switch member 66 and close the circuit therethrough when the solenoid has been energized to cause the core to depress the button 5. The closing of the circuit through the switch member 66 energizes the magnet 63, which will release the pawl 55 and allow the disc 50 to return to its normal position.

Each of the switches D, E and F are provided with a similar mechanism to depress the buttons 6, 7 and 8, respectively.

Switch D is shown in Figure 1 as mounted on the floorboards of the trunk of the automobile in a position parallel to the longitudinal axis thereof and includes a sliding contact 68 mounted on guides 69 between upright posts 70 and 71 of insulating material. The post 70 is provided with a contact 71ª passing therethrough to the ground. As the automobile comes to a sudden stop contact 68 will be caused to slide forward and engage the contact 71ª which will close the circuit through wire 72, wire 67, wire 24 to circular contact 19 to operate the disc 50 and parts controlled thereby, as described in connection with switch C. A spring 73 is provided to rotate a drum 74 mounted on the rear post 71 to yieldingly maintain the sliding contact 68 out of engagement with the contact 71ª by a strap 75 secured at one end of the contact 68 and passing about the circumference and secured to the drum 74, as shown in Figure 2.

The switch E is in the form of a commercial mercury tube electric switch 76 which is shown in Figure 1 as being mounted upon the floorboards of the trunk in an adjustable holder 77 so that the axis of the switch lies approximately parallel with the axis of the car and may be so adjusted that when the car ascends a hill as the road departs from the horizontal the globule of mercury 78 will travel to the opposite end of the tube and close the circuit between the contacts 79 and thereby closing the circuit from the ground through wire 80, wire 67, wire 24 to circular contact 19 to operate the disc 50 and parts controlled thereby, as described in connection with switch C. It is to be noted that the holder 77 may be adjusted so that the switch will only operate when ascending inclines of a desired degree.

The switch F is designed to close the circuit through wire 81, wire 67, wire 24 to the circular contact 19 to operate the disc 50 and parts controlled thereby, as described in connection with switch C, by the vibrations between the axle of the wheels and the body or chassis of the automobile when the automobile is driven over rough roads. The form illustrated in Figure 2 is one of various devices which may be employed to accomplish this purpose. In the form shown one member of the switch includes a disc 82 secured upon a rod 83, the lower end of which is mounted in a universal socket 84 secured to the upper surface of the vehicle spring 85 mounted on the axle of the car. The free end of the rod 83 is mounted to reciprocate in a guide 86 mounted upon the chassis to normally maintain the rod 83 in a vertical plane. A bushing of insulating material 87 through which the rod may reciprocate is attached to the underside of the guide 86. This bushing of insulating material mounts a sleeve 88 which may be engaged by the disc 82 to close the circuit through wire 81 as heretofore described, however, it is preferable to provide a spring buffer between the disc 82 and the contact sleeve 88, such as illustrated in Figure 2. This buffer includes a coil spring 89 interposed between the contact sleeve 88 and an annular contact member 90 carried upon the lower end of the spring whereby the vibrations of the car in reciprocating the contact disc 82 into and out of engagement to close the circuit through the contact sleeve may be accomplished without injury to these parts.

If desired, the ease of riding at fast speeds may be caused to select and operate a phonograph disc when a desired speed is attached, without the interposition of the solenoid actuating mechanism illustrated and described as being located between the operating switches C, D, E and F and their respective solenoids.

Switch G includes a centrifugal governor 91 actuated through a train of gears by the rotation of the driving shaft 92 of the automobile motor and so adjusted that when the desired rate of speed is reached the governor will have caused a disc 93 carried thereby to close a normally open switch to cause the circuit from the ground through wire 94 through a solenoid 95, of similar construction to the solenoids 21 and 26, for depressing the button 9, and through the wire 67 and wire 24 to the circular contact 19, as there is no need of a step-by-step operating mechanism between the governor and the solenoid.

Provision is also made so that at the end of the demonstration any of the mechanisms interposed between the solenoids and switches C, D, E or F which may have caused their respective ratchet discs 50 to be partially rotated may be released to return to their normal position. To accomplish this release an additional circuit is provided between the release magnets 63 and the battery B. This includes the provision of an inner concentric circular contact 95ª similar to the circular contact 19 which will be travelled over by the contact arm 15 while in engagement with contact 17, 18 or 19 and the wires 24, 72, 80 and 81 are each provided with a flexible conductor 96 to the insulated contact 61 carried on the armature 60 of the respective magnets 63. Contact 61 when the magnet is energized is carried to engage a contact 97 upon the end of a wire 98 connected to the movable member 99 of a normally closed switch, the other member of which is connected to the windings of the magnet 63 by wire 100. This switch is so arranged that when the disc 50 is in normal position in engagement with the stud 52 the switch operator arm 51 has engaged the movable member 99 and opened the switch so that in the normal position of the disc 50 this switch is maintained open. When the body movement actuated switch has imparted a step-by-step movement to the disc 50 the arm 51 is moved away from member 99 and the circuit is completed between wire 99 and wire 100, and thereafter when the movement of the arm 51 has closed the circuit between wires 35 and grounded switch member 58 to energize the solenoid 34 to depress the button the extension 67a on the other end of the solenoid will close the circuit from circular contact 19, wire 24, wire 67 to wire 65 and wire 64 to energize the magnet 63 to attract the armature 60 the contact 61 thereon will engage the contact 97 to close the circuit from wire 24 through conductor 96, contacts 61 and 97, wire 98 through contact 99 to wire 100, through wire 64 and windings of magnet 63 to ground which will thereby release the pawl 55 until the switch actuator extending arm 51 again opens the switch through switch arm 99.

The inner concentric contact 95a is connected by wire 101 to a contact post 102 so that when the switch 13 has been rotated to disengage contact 14 it may be brought into engagement with contact 102 and at the same time with contact 103 which latter contact is connected by wire 104 to wire 98 so that if the switch arm 51 on any of the mechanisms has closed the contact between wire 98 and wire 100 the battery will be placed in circuit through switch arm 13, contact 103 and 104, wires 98 through switch 99 and wire 100 through wire 64 to energize the magnet 63 and thereby release the disc 50 allowing it to return to normal and open the switch member 99.

Inasmuch as a wire 104 is shown in the wiring diagram as extending through the mechanisms actuated by switches C, D and F, and any of these mechanisms have been partially operated so that the corresponding movable switch member 99 has closed the circuit to the corresponding release magnet 66 each of these mechanisms will be released in the same manner as the one first described.

With the connections between the mechanisms, as shown in Figure 2, the same release of other mechanisms will occur if any of them have been partially operated before the solenoid of one has been energized to depress its selecting button.

It is to be understood that this invention is not to be limited to the particular construction of the switches C, D, E, F and G, illustrated on Figure 2 of the drawings, nor to the particular construction of the timer mechanism, as these switches and this mechanism are shown and described herein as being of a general type for the purposes set forth. Likewise, the switches, magnets and ratchet discs and pawls forming the mechanism interposed between the switches C, D, E and F and the solenoids for depressing the push buttons are merely an example of a type to accomplish the desired result, and therefore, the invention is not restricted to the particular constructions and arrangements shown on Figure 2 of the drawings.

In a like manner, movements of any part of the car body, as the opening of the hood, the opening of the side doors, the opening of the door in the trunk, or the opening of the windows or windshield may be employed to operate switches to actuate the phonograph disc selectors without departing from the scope of this invention.

While the term phonograph disc changer mechanism has been used in describing an embodiment of this invention, the invention is not limited to phonograph discs, as any form of sound records may be employed as well. This invention contemplates the employment of any form or type of mechanism for changing and operating sound records, whether they be discs, cylinders, tape or other forms of means for recording sounds for reproduction in combination with electrically operated mechanism set in operation by the movements of the body or vehicle upon which the apparatus is mounted.

What I claim is:

1. In a system for announcing items of interest pertaining to a motor driven vehicle, an apparatus adapted to be mounted on the vehicle and provided with a series of actuating members to selectively operate a series of actuated elements controlling the announcing of said items, said apparatus comprising a source of electricity, a timing mechanism, an electric circuit in which the source and timing mechanism are interposed, an electric device associated with each of said actuating members for moving the actuating members into engagement with said actuated elements, said electric devices being interposed in said circuit and adapted, when the circuit is closed therethrough, to conect, for a predetermined time, the respective devices to said source, auxiliary circuits in electrical connection with the first mentioned circuit, and a normally open automatic switch in each auxiliary circuit between the timing mechanism and each device, responsive to a movement of the vehicle to close its respective auxiliary circuit to actuate the individual electric device associated with that circuit.

2. In a system for announcing items of interest pertaining to a motor driven vehicle, an apparatus adapted to be mounted on the vehicle and to selectively operate a plurality of actuating members adapted to control actuated elements which in turn control the announcing of said items, said apparatus comprising an electromagnet for moving one of said actuating members, a source of electricity, a circuit in which said source and electro-magnet are interposed, a timing mechanism interposed in the circuit between said source and said electro-magnet, a normally open switch interposed in the circuit between the electro-magnet and said source, and means responsive to a movement of the vehicle for closing said switch.

3. In a system for announcing items of interest pertaining to a motor driven vehicle, an apparatus adapted to be mounted on the vehicle and to selectively operate a plurality of actuating members adapted to control actuated elements which in turn control the announcing of said items, said apparatus comprising an electromagnet for moving one of said actuating members, a source of electricity, a circuit in which said source and electro-magnet are interposed, a timing mechanism interposed in the circuit between said source and said electro-magnet, a normally open switch interposed in the circuit between the electro-magnet and said source, and means responsive to a movement of the vehicle for closing said switch, the last mentioned means comprising an auxiliary circuit, and auxiliary electro-magnet interposed in the auxiliary circuit, an armature actuated by the auxiliary electro-magnet, a pawl actuated by the armature, a ratchet wheel actuated by the pawl, and a member movable with the ratchet wheel and engageable with said switch.

4. In a system for announcing items of interest pertaining to a motor driven vehicle, an apparatus adapted to be mounted on the vehicle and to selectively operate a plurality of actuating members controlling the announcing of said items, said apparatus comprising an electro-magnet controlling the movement of one of said actuating members, a source of electricity, an electric circuit in which said source and said electro-magnet are interposed, a timing mechanism interposed in the circuit between the source and the electro-magnet, a normally open switch interposed in the circuit between said electro-magnet and said source, a conductor associated with said circuit, an auxiliary electro-magnet interposed in said conductor, a normally open automatic switch interposed in the conductor and acting in response to a movement of the vehicle for controlling the circuit through the auxiliary electro-magnet, and means controlled by the auxiliary electro-magnet for closing the first mentioned switch.

EDWARD CLANCY.